United States Patent Office 2,813,111
Patented Nov. 12, 1957

2,813,111
ORGANIC COMPOUNDS AND PROCESS
John A. Hogg, Kalamazoo Township, Kalamazoo County, Philip F. Beal, Portage Township, Kalamazoo County, and Frank H. Lincoln, Jr., Kalamazoo Township, Kalamazoo County, Mich., assignors to The Upjohn Company, Kalamazoo, Mich., a corporation of Michigan No Drawing. Application June 11, 1956,
Serial No. 590,368

6 Claims. (Cl. 260—397.45)

The present invention relates to novel steroid compounds and is more particularly concerned with 14α-methyl-17α,21-dihydroxy-4-pregnene-3,11,20-trione (14α-methylcortisone), 14α - methyl - 11β,17α,21-trihydroxy-4-pregnene-3,20-dione (14α-methylhydrocortisone), the 21-esters thereof and a process for the production thereof.

The novel compounds and the process of production thereof can be represented by the following formulae:

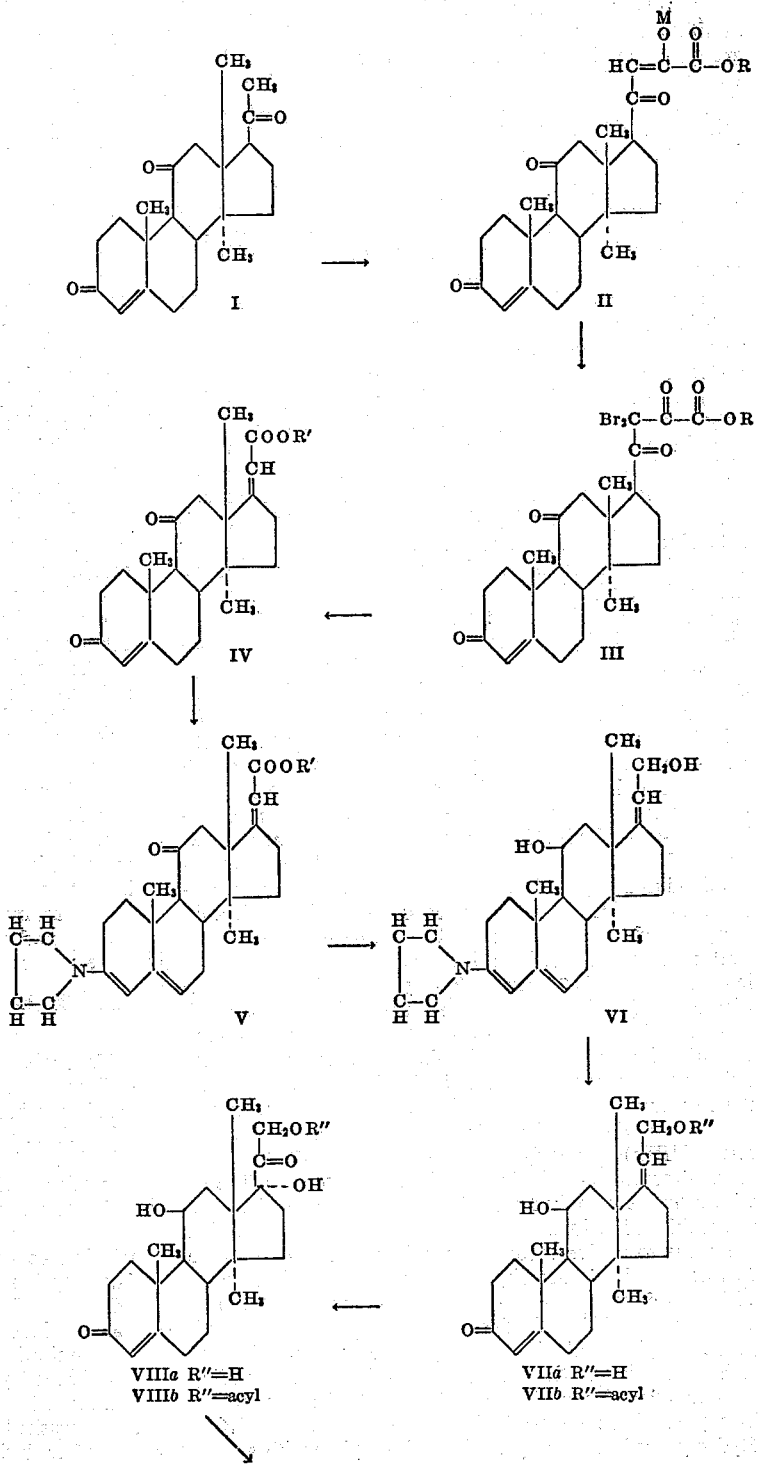

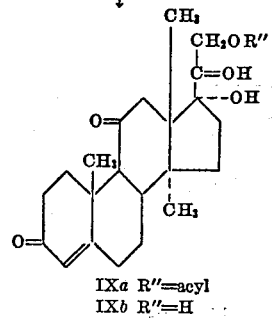

IXa R″=acyl
IXb R″=H wherein M is a metal selected from the group consisting of lithium, sodium, and potassium, R and R′ are alkyl groups containing from one to eight carbon atoms, inclusive, and R″ is selected from the group consisting of hydrogen and the acyl radical of an organic carboxylic acid, preferably a hydrocarbon carboxylic acid containing from one to twelve carbon atoms, inclusive.

The process of the present invention comprises: treating 14α-methyl-11-ketoprogesterone (I) with a lower-alkyl oxalic acid ester in the present of an alkali-metal base to obtain the corresponding alkali-metal enolate of 21 - lower - alkyl - oxalyl-14α-methyl-11-ketoprogesterone (II); treating the thus-obtained alkali-metal enolate (II) with bromine to obtain the corresponding 14α-methyl-11-keto-21, 21-dibromo-21-lower-alkyloxyoxalylprogesterone (III); treating the thus-produced dibromo compound (III) with an alkali-metal alkoxide in an alkenol, preferably wherein the alkoxy group of the alkali metal alkoxide and the alkanol are identical and contain from one to eight carbon atoms, inclusive, to give the corresponding 14α - methyl - 3,11-diketo-4,17(20)-pregnadien-21-oic acid alkyl ester (IV); treating the thus obtained 14α-methyl-3,11-diketo-4,17(20)-pregnadien-21-oic acid alkyl ester (IV) with a secondary cyclic amine, such as pyrrolidine, morpholine, piperidine, or the like, to form the corresponding 3-enamine, illustratively 3-pyrrolidyl-14α-methyl-11-keto-3,5,17(20)-pregnatrien-21-oic acid methyl alkyl ester (V); reducing the thus-produced 3-pyrrolidyl enamine (V) with a metal hydride, such as lithium aluminum hydride, sodium borohydride, or the like, to obtain 3 - pyrrolidyl - 14α - methyl-11β,21-dihydroxy-3,5,17(20)-pregnatriene (VI); hydrolyzing the thus-produced 3 - pyrrolidyl - 14α-methyl-11β,21-dihydroxy-3,5,17(20)-pregnatriene (VI) with a base produced the corresponding 14α-methyl-11β,21-dihydroxy-4,17(20)-pregnadien-3-one (VIIa); esterifying the thus-produced 14α-methyl-11β,21-dihydroxy-4,17(20)-pregnadien-3-one (VIIa) with a halide or anhydride of an organic carboxylic acid, preferably a hydrocarbon carboxylic acid containing from one to twelve carbon atoms, inclusive, produced the corresponding 14α-methyl-11β-hydroxy-21-acyloxy-4,17(20)-pregnadien-3-one (VIIb); treating the thus-produced 14α-methyl - 11β - hydroxy-21-acyloxy-4,17(20)-pregnadien-3-one (VIIb) with osmium tetroxide in the presence of a peroxide such as hydrogen peroxide and thereafter treating the resulting crude product with sodium sulfite produced 14α - methyl - 11β,17α,21-trihydroxy-4-pregnene-3,20-dione (VIIIa); esterifying 14α-methyl-11β,17α,21-trihydroxy-4-pregnene-3,20-dione (14α-methylhydrocortisone) with a halide or anhydride of an organic carboxylic acid, preferably of a hydrocarbon carboxylic acid containing from one to twelve carbon atoms, inclusive, produces the 21-esters of 14α-methylhydrocortisone (14α-methyl-11β,17α - dihydroxy - 21 - acyloxy-4-pregnene-3,20-dione, compound VIIIb). Oxidation of 14α-methylhydrocortisone 21-acylate with chromic anhydride or an alkali metal dichromate in acetic acid produces the corresponding 14α-methylcortisone 21-acylate (14α-methyl-17α-hydroxy-21-acyloxy-4-pregnene-3,11,20-trione, compound IXa). Hydrolysis of 14α-methylcortisone 21-acylate with a base, preferably in a nitrogen atmosphere, produces the free diol, 14α - methyl - 17α,21-dihydroxy-4-pregnene-3,11,20-trione (14α-methylcortisone, compound IXb).

It is an object of the instant invention to provide 14α-methylcortisone, 14α-methylhydrocortisone, and the 21-esters thereof, especially those of hydrocarbon carboxylic acids containing from one to twelve carbon atoms, inclusive. It is another object of the instant invention to provide a process for the production of these 14α-methylcortisone and 14α-methylhydrocortisone products and also to provide the intermediates necessary to produce such 14α-methylcortisone and 14α-methylhydrocortisones. Other objects will be apparent to those skilled in the art to which this invention pertains.

The new compounds, 14α-methylcortisone and 14α-methylhydrocortisone, are adrenocortical hormones, superior to the corresponding cortisone and hydrocortisone, having a high potency, especially in rheumatoid arthritis and minimal side effects. They are highly anti-inflammatory agents and can be used in oral or parenteral preparations such as tablets and injectable preparations. They are also useful for the preparation of topically applied ointments, as drops for eye, ear, or nose inflammatory conditions, as ingredients in dentifrices for inflammatory conditions of the gingiva, as active ingredients in bougies and suppositories for inflammatory vaginal and rectal conditions, and the like.

The starting material for the instant compounds is 14α-methyl-11-ketoprogesterone, known in the art [Voser et al., Helv. Chim. Acta 36, 299 (1953); Kyburg et al., Helv. Chim. Acta 36, 1891 (1953)].

In carrying out the process of the instant invention, the procedure of Patents 2,683,724, 2,735,856, and of application S. N. 307,385, filed August 30, 1952, issued as Pat. No. 2,774,776, can be followed except that the starting material is 14α-methyl-11-ketoprogesterone instead of 11-ketoprogesterone.

The following examples are illustrative of the detailed process and products of the present invention, but are not to be construed as limiting.

*Example 1.—Sodium enolate of 14α-methyl-11-keto-21-ethoxyoxalylprogesterone*

To a mixture of 3.4 milliliters of a 3.4 normal ethanolic sodium ethoxide solution (0.0116 mole), 0.45 milliliter of absolute ethanol, and twenty milliliters of dry benzene, said mixture previously having been distilled until eight milliliters of distillate had been collected and then cooled, was added 2.3 milliliters (0.0151 mole) of ethyl oxalate and a solution of 3.42 grams (0.01 mole) of 14α-methyl-11-ketoprogesterone in 38 milliliters of dry benzene. The solution became turbid and a yellow precipitate formed. The reaction mixture was stirred for ninety minutes, 55 milliliters of ether was then added thereto, and stirring was continued for a period of sixty minutes, whereafter a 130-milliliter portion of ether was added thereto. The thus-formed yellow precipitate of the sodium enolate of 14α-methyl-11-keto-21-ethoxyoxalylprogesterone was filtered, washed with three fifty-milliliter portions of ether, and after drying found to weigh 3.80 grams. The ether wash contained 0.56 gram of unreacted 14α-methyl-11-ketoprogesterone. The yield of the sodium enolate of 14α-methyl-11-keto-21-ethoxyoxalylprogesterone was 81 percent of the theoretical or practically quantitative calculated on the reacted 14α-methyl-11-ketoprogesterone. The presence of a sodium enolate was verified by the extreme solubility of the product in water and by a positive ferric chloride test for enols as exhibited by the formation of a bright red color when the product was dissolved in alcoholic and aqueous ferric chloride solutions.

*Example 2.—Potassium enolate of 14α-methyl-11-keto-21-methoxyoxalylprogesterone*

In the same manner as shown in Example 1, reacting 14α-methyl-11-ketoprogesterone with methyl oxalate in the presence of methanolic potassium methoxide solution yielded the potassium enolate of 14α-methyl-11-keto-21-methoxyoxalylprogesterone.

In the same manner given in Examples 1 and 2, reacting 14α-methyl-11-ketoprogesterone with alkyl oxalate, such as methyl, ethyl, propyl, isopropyl, butyl, isobutyl, amyl, hexyl, heptyl, octyl oxalate in the presence of an alkali metal base, for example, lithium ethoxide, sodium methoxide, potassium butoxide and the like results in the corresponding lithium, potassium, or sodium enolate of 14α-methyl-11-keto-alkyloxyoxalylprogesterone in which the alkyl group has from one to eight carbon atoms, inclusive, as exemplified above.

*Example 3.—14α-methyl-11-keto-21,21-dibromo-21-ethoxyoxalylprogesterone*

To a stirred solution of 4.64 grams (0.01 mole) of the sodium enolate of 14α-methyl-11-keto-21-ethoxyoxalylprogesterone and two grams of potassium acetate in seventy milliliters of glacial acetic acid was added 3.09 grams (1.00 milliliter; 0.0193 mole) of bromine dropwise at room temperature. When the addition was complete, the reaction mixture was mixed with a large volume of water. The aqueous layer was then decanted from the precipitated viscous yellow product which was thereafter dissolved in alcohol and reprecipitated as a white solid by the dropwise addition of water. The yield of thus-produced 14α-methyl-11-keto-21,21-dibromo-21-ethoxyoxalylprogesterone, after filtering and drying, was 4.1 grams, a yield of seventy percent of the theoretical.

*Example 4.—14α-methyl-11-keto-21,21-dichloro-21-methoxyoxalylprogesterone*

In the same manner given in Example 3, treating the potassium enolate of 14α-methyl-11-keto-21-methoxyoxalylprogesterone with chlorine, dissolved in carbon tetrachloride, produced 14α-methyl-11-keto-21,21-dichloro-21-methoxyoxalylprogesterone.

In the same maner as shown in Examples 3 and 4, treating the alkali-metal enolates of 14α-methyl-11-keto-21-alkoxyoxalyl progesterone with bromine or chlorine is productive of other 14α-methyl-11-keto-21,21-dihalo-21-alkoxyoxalylprogesterones wherein the halo atom is bromine or chlorine. Thus produced 14α-methyl-11-keto-21,21-dihalo-21-alkoxyoxalylprogesterones include: 14α-methyl-11-keto-21,21-dibromo-21-methoxyoxalylprogesterone, 14α-methyl-11-keto-21,21-dibromo-21-propoxyoxalylprogesterone, 14α-methyl-11-keto-21,21-dibromo-21-isopropoxyoxalylprogesterone, 14α-methyl-11-keto-21,21-dibromo-21-butoxyoxalylprogesterone, 14α-methyl-11-keto-21,21-dibromo-21-amyloxyoxalylprogesterone, 14α-methyl-11-keto-21,21-dibromo-21-hexyloxyoxalylprogesterone, 14α-methyl-11-keto-21,21-dibromo-21-heptyloxyoxalylprogesterone, 14α-methyl-11-keto-21,21-dibromo-21-octyloxyoxalylprogesterone, 14α-methyl-11-keto-21,21-dichloro-21-ethoxyoxalylprogesterone, 14α-methyl-11-keto-21,21-dichloro-21-propoxyoxalylprogesterone, 14α-methyl-11-keto-21,21-dichloro-21-isopropoxyoxalylprogesterone, 14α-methyl-11-keto-21,21-dichloro-21-butoxyoxalylprogesterone, 14α-methyl-11-keto-21,21-dichloro-21-amyloxyoxalylprogesterone, 14α-methyl-11-keto-21,21-dichloro-21-hexyloxyoxalylprogesterone, 14α-methyl-11-keto-21,21-dichloro-21-heptyloxyoxalylprogesterone, 14α-methyl-11-keto-21,21-dichloro-21-octyloxyoxalylprogesterone, and the like.

*Example 5.—14α-methyl-3-11-diketo-4,17(20)-pregnadien-21-oic acid methyl ester*

To a solution of 6.04 grams (0.01 mole) of 14α-methyl-11-keto-21,21-dibromo-21-ethoxyoxalylprogesterone in 150 milliliters of methanol was added 3.24 grams (0.06 mole) of commercial grade sodium methoxide. The resulting admixture was maintained for three hours at about 25 degrees centigrade, whereafter the whole was diluted with water and then extracted with two portions of methylene chloride. The methylene chloride extracts were dried with anhydrous sodium sulfate and the solvent was thereafter distilled at atmospheric pressure, leaving a quantitative yield of 3.74 grams of 14α-methyl-3,11-diketo-4,17(20)-pregnadien-21-oic acid methyl ester as an oil. This oil was dissolved in fifty milliliters of benzene and chromatographed over a column of 170 grams of Florisil synthetic magnesium silicate. The column was developed with 400-milliliter portions of solvent of the following composition and order: three portions of methylene chloride, five portions of methylene chloride plus five percent acetone, and one portion of acetone. The methylene chloride plus five percent acetone eluates were combined and the solvent was removed therefrom leaving 1.5 grams of crystalline 14α-methyl-3,11-diketo-4,17(20)-pregnadien-21-oic acid methyl ester.

*Example 6.—14α-methyl-3,11-diketo-4-17(20)-pregnadien-4-oic acid ethyl ester*

In the same manner given in Example 5, treating 14α-methyl-11-keto-21,21-dichloro-21-methoxyalylprogesterone, dissolved in ethanol, with sodium ethoxide produced 14α-methyl-3,11-diketo-4,17(20)-pregnadien-21-oic acid ethyl ester.

In the same manner as shown in Examples 5 and 6, treating other 14-methyl-11-keto-21,21-dihalo-21-alkoxyoxalylprogesterone as shown above with a selected alkanol and alkali metal alkoxide, preferably wherein the alkoxy groups of the alkali metal alkoxide and the alkanol are identical and contain from one to eight carbon atoms, inclusive, e. g., sodium ethoxide in ethanol, sodium isopropoxide in isopropanol, potassium tertiary butoxide in tertiary butyl alcohol, lithium methoxide in methanol, sodium octoxide in octanol and the like, produces the corresponding 14α-methyl-3,11-diketo-4,17(20)-pregnadien-21-oic acid alkyl esters, wherein the alkyl group is methyl, ethyl, propyl, isopropyl, butyl, isobutyl, tertiary butyl, amyl, hexyl, heptyl, octyl, and the like.

*Example 7.—14α-methyl-11β,21-dihydroxy-4,17(20)-pregnadien-3-one and its conversion to 14α-methyl-11β-hydroxy-21-acetoxy-4,17(20)-pregnadien-3-one*

A solution of 3.12 grams of 14α-methyl-3,11-diketo-4,17(20)-pregnadien-21-oic acid methyl ester and three milliliters of pyrrolidine in sixty milliliters of benzene was heated at its refluxing temperature for one hour with the concomitant removal of the water of reaction, producing 3-(N-pyrrolidyl)-14α-methyl-11-keto-3,5,17(20)-pregnatrien-21-oic acid methyl ester. The solvent was distilled from the resulting mixture at reduced pressure and the residue dissolved in a mixture of fifteen milliliters of benzene and ten milliliters of ether.

To this solution of 3-(N-pyrrolidyl)-14-methyl-11-keto-3,5,17(20)-pregnatrien-21-oic methyl ester was added 1.1 grams of lithium aluminum hydride suspended in 175 milliliters of ether. The resulting solution was stirred for 1.5 hours at about 26 degrees centigrade. Ten milliliters of ethyl acetate followed by fifteen milliliters of water were added to the solution and the solvent was distilled therefrom at reduced pressure to give a residue, consisting essentially of inorganic salts and 3-pyrrolidyl - 14α - methyl - 11β,21-dihydroxy-3,5,17(20)-pregnatriene.

This residue was suspended in 200 milliliters of methanol and 35 milliliters of a five percent aqueous sodium hydroxide solution was added to the suspension. The whole was then heated at forty to 45 degrees centigrade for ten minutes. The cooled mixture was neutralized with acetic acid and the methanol distilled therefrom. The residue was stirred with fifty milliliters of concentrated hydrochloric acid. The methylene chloride solution was separated from the aqueous layer, which was then extracted with another portion of methylene chloride, and the extract added to the original methylene chloride solution. The solvent was evaporated from the extracts leaving 2.98 grams of crude 14α-methyl-11β,21-dihydroxy-4,17(20)-pregnadien-3-one.

The 2.98 grams of 14α-methyl-11β,21-dihydroxy-4,17(20)-pregnadien-3-one thus obtained was treated with five milliliters of acetic anhydride in ten milliliters of pyridine at 26 degrees centigrade for four hours. The resulting mixture was mixed with ten milliliters of water with cooling to hydrolyze the excess acetic anhydride, and the solution extracted with methylene chloride. The extract was washed with dilute hydrochloric acid, water, a saturated aqueous sodium bicarbonate solution, and finally water. The methylene chloride was distilled from the solution and the 2.74 gram residue, representing an 82.8 percent yield, based on starting 14α-methyl-3,11-diketo-4,17(20)-pregnadien-21-oic acid methyl ester, was recrystallized from a mixture of acetone and Skellysolve B hexane hydrocarbons to give 1.70 grams, a yield of 51 percent of the theoretical of 14α-methyl-11β-hydroxy-21-acetoxy-4,17(20)-pregnadien-3-one.

*Example 8.—14α - methyl - 11β,21-dihydroxy-4,17(20)-pregnadien-3-one and its conversion to 14α-methyl-11β-hydroxy-21-benzoyloxy-4,17(20)-pregnadien-3-one*

In the manner given in Example 7, 14α-methyl-3,11-diketo-4,17(20)-pregnadien-21-oic acid ethyl ester was heated to reflux with morpholine in methanol solution to give 3 - (N-morpholinyl)-14α-methyl-11-keto-3,5,17(20)-pregnatrien-20-oic acid ethyl ester which was reduced with lithium aluminum hydride to give 3-(N-morpholinyl) - 14α - methyl-11β,21-dihydroxy-3,5,17(20)-pregnatriene. Hydrolyzing 3 - (N-morpholinyl) - 14α-methyl-11β,21-dihydroxy-3,5,17(20)-pregnatriene with aqueous ethanolic potassium hydroxide solution as shown in Example 7 yielded 14α-methyl-11β,21-dihydroxy-4,17(20)-pregnadien-3-one.

Treating the thus obtained 14α-methyl-11β,21-dihydroxy-4,17(20)-pregnadien-3-one with benzoyl chloride in pyridine solution yielded 14α-methyl-11β-hydroxy-21-benzoyloxy-4,17(20)-pregnadien-3-one.

In the same manner given in Examples 7 and 8, treating the 14α-methyl-3,11-diketo-4,17(20)-pregnadien-21-oic acid alkyl esters of Examples 5 and 6 with a secondary cyclic amine such as pyrrolidine, substituted pyrrolidine, morpholine, homo-morpholine, substituted oxazolidine, piperidine or the like produces the corresponding 3-(N-tertiary cyclic enamino)-14α-methyl-11-keto-3,5,17(20)-pregnatrien-21-oic acid alkyl ester which by reduction with a metal hydride such as lithium aluminum hydride, sodium borohydride or the like produces the corresponding 3-(N-tertiary cyclic enamino)-14α-methyl-11β,21-dihydroxy-3,5,17(20)-pregnatriene which by hydrolysis with a base, such as lithium, sodium, potassium, calcium, barium or other alkali or earth alkali hydroxide, preferably hydroxides of the alkali metals in aqueous alcoholic solution or suspension produces 14α-methyl-11β,21-dihydroxy-4,17(20)-pregnadien-3-one.

Esterification of the thus-obtained 14α-methyl-11β,21-dihydroxy-4,17(20)-pregnadien-3-one with an acid anhydride such as, for example, propionic, butyric, valeric, and the like, or with an acid halide such as trimethylacetyl chloride, hexanoyl chloride, heptanoyl bromide, octanoyl chloride, β-cyclopentylpropionyl chloride, toluyl chloride, phenylacetyl chloride, phenylpropionyl chloride, and the like, in pyridine solution gives the corresponding 21-ester of 14α-methyl-11β,21-dihydroxy-4,17(20)-pregnadien-3-one such as, for example, the 21-trimethylacetate, propionate, butyrate, valerate, hexanoate, heptanoate, octanoate, benzoate, toluate, phenylacetate, phenylpropionate, β-cyclopentylpropionate, and the like.

*Example 9.—14α-methyl-11β,17α,21-trihydroxy - 4 - pregnene-3,20-dione (14α-methylhydrocortison)*

To a stirred suspension of 0.128 gram (0.00033 mole) of 14α-methyl-11β-hydroxy - 21 - acetoxy-4,17(20)-pregnadien-3-one in two milliliters of tertiary butyl alcohol was added 0.26 milliliter of a 2.6 molar solution of hydrogen peroxide in tertiary butyl alcohol and 0.30 milliliter of a solution of 1.00 gram of osmium tetroxide in 100 milliliters of tertiary butyl alcohol. An additional 0.50 milliliter of the above-described osmium tetroxide solution was added to the reaction mixture during the next thirty hours. After the first four hours of reaction time the reaction mixture darkened and became homogeneous. The reaction mixture was stirred and maintained at room temperature for an additional 84 hours, whereafter water and methylene chloride were added thereto. The whole was distilled at reduced pressure to remove the organic solvents and the product was extracted from the residue with methylene chloride, whereafter the extract was freed of solvent by evaporation. The residue, after dissolving in a mixture of five milliliters of methanol and one milliliter of a solution of 0.30 gram of sodium sulfite in five milliliters of water, was heated on a steam bath for thirty minutes. The 14α-methyl-11β,17α,21-trihydroxy-4-pregnene-3,20-dione was separated therefrom by extraction with methylene chloride, which was thereafter removed by distillation in vacuo. The residue, 104 milligrams, was three times recrystallized from acetone-Skellysolve B hexanes to give 42 milligrams of 14α-methyl-11β,17α,21-trihydroxy - 4 - pregnene-3,20-dione (14α-methylhydrocortisone). The infrared absorption spectra measured in both Nujol, chloroform and carbon tetrachloride confirmed the above postulated structure.

In the same manner as shown in Example 9, other 21-esters of 4,21-dihydroxy-4,17(20)-pregnadien-3-one when treated with hydrogen peroxide in the presence of osmium tetroxide in a suitable solvent such as tertiary butyl alcohol or the like undergo the oxidative hydroxylation to produce 14α-methyl-11β,17α,21-trihydroxy - 4 - pregnene-3,20-dione. Useful esters for this reaction are the propionate, butyrate, isobutyrate, valerate, hexanoate, heptanoate, octanoate, benzoate, phenylacetate, toluate, β-cyclopentylpropionate or the like 21-esters of 14α-methyl-11β,21-dihydroxy-4,17(20)-pregnadien-3-one.

*Example 10.—14α - methyl-11β,17α,21-trihydroxy-4-pregnene-3,20-dione 21-acetate (14α-methylhydrocortisone 21-acetate)*

To a solution of 0.7 gram of 14α-methyl-11β-hydroxy-21-acetoxy-4,17(20)-pregnadien-3-one in 35 milliliters of dry tertiary butyl alcohol was added at room temperature, five milliliters of dry pyridine, three milliliters of dry tertiary butyl alcohol solution containing 0.7 gram of N-methylmorpholine oxide peroxide and ten milligrams of osmium tetroxide, in that order. The resulting solution was stirred at between 25 and thirty degrees centigrade for eighteen hours. Thereafter 75 milliliters of water was added to the mixture, the mixture extracted thoroughly with methylene chloride, the methylene chloride solution washed with water, five percent dilute hydrochloric acid, five percent aqueous sodium bicarbonate, water, and then dried over anhydrous sodium sulfate. The solvent was distilled from the dried solution at reduced pressure. The crude residue was dissolved in methylene chloride and poured over a column of ten grams of Florisil synthetic magnesium silicate and developed with Skellysolve B hexane in acetone solution containing from ten to twenty percent acetone. The Skellysolve B plus twelve percent acetone and Skellysolve B plus fifteen percent acetone fractions were combined and evaporated, and the residue repeatedly recrystallized from methanol to give 14α-methyl-11β,17α-dihydroxy-21-acetoxy-4-pregnene-3,20-dione.

In the same manner as shown in Example 10 reacting other 14α-methyl-11β-hydroxy-21-acyloxy-4,17(20)-pregnadien-3-one as produced in Examples 7 and 8 with osmium tetroxide and N-methylmorpholine oxide peroxide or other secondary amino oxide peroxide compounds in tertiary butyl alcohol solution in the presence of pyridine yields the corresponding 21-ester of 14α-methyl-11β,17α,21-trihydroxy-4-pregnene-3,20-dione.

*Example 11.—14α-methyl-11β,17α,21 - trihydroxy-4-pregnene-3,20-dione 21-propionate*

Two hundred milligrams of 14α-methyl-11β,17α,21-trihydroxy-4-pregnene-3,20-dione (14α-methylhydrocortisone), dissolved in two milliliters of pyridine were admixed with two milliliters of propionic anhydride. The mixture was allowed to stand at room temperature (about 25 degrees centigrade) for a period of eight hours and thereupon diluted with fifty milliliters of water and extracted with three ten-milliliter portions of methylene chloride. The methylene chloride extracts were dried over anhydrous sodium sulfate, evaporated and the residue recrystallized three times from methanol to give 14α-methyl - 11β,17α,21-trihydroxy-4-pregnene-3,20-dione 21-propionate (14α-methylhydrocortisone 21-propionate).

*Example 12.—14α-methyl-11β,17α - dihydroxy-21-phenylacetoxy-4-pregnene-3,20-dione (14α - methylhydrocortisone-21-phenylacetate)*

In the same manner as shown in Example 11, reacting 14α-methyl - 11β,17α,21 - trihydroxy - 4 - pregnene-3,20-dione with phenylacetyl chloride in pyridine solution gave 14α-methyl-11β,17α - dihydroxy-21-phenylacetoxy-4-pregnene-3,20-dione.

*Example 13*

In the same manner as shown in Example 11, reacting 14α - methyl-11β,17α,21-trihydroxy - 4 - pregnene-3,20-dione (14α-methylhydrocortisone) in pyridine solution with (a) butyric anhydride yielded 14α-methylhydrocortisone butyrate, (b) valeric anhydride yielded 14α-methylhydrocortisone valerate, (c) hexanoyl chloride yielded 14α-methylhydrocortisone hexanoate, (d) heptanoyl chloride yielded 14α-methylhydrocortisone heptanoate, (e) octanoyl bromide yielded 14α-methylhydrocortisone octanoate, (f) toluyl chloride yielded 14α-methylhydrocortisone toluate, (g) phenylpropionyl chloride yielded 14α-methylhydrocortisone phenylpropionate (h) β-cyclopentylpropionyl chloride yielded 14α-methylhydrocortisone β-cyclopentylpropionate, (i) cinnamyl bromide yielded 14α-methylhydrocortisone cinnamate, (j) hemisuccinyl chloride yielded 14α-methylhydrocortisone acid succinate, (k) 2-furoyl chloride yielded 14α-methylhydrocortisone 2-furoate, (l) toluenesulfonyl chloride yielded 14α-methylhydrocortisone toluenesulfonate, (m) nicotinyl chloride yielded 14α-methylhydrocortisone nicotinate, and (n) trimethylacetyl chloride yielded 14α-methylhydrocortisone trimethylacetate.

In the same manner as shown in Examples 11 through 13, reacting other anhydrides or acid halides of an organic carboxylic, preferably of a hydrocarboncarboxylic acid with 14α-methylhydrocortisone produces the corresponding 14α-methylhydrocortisone 21-esters, such as, for example, the 21-triethylacetate, dineopentylacetate, phenylacetate, tertiary butylacetate, crotonate, acrylate, chloroacetate, bromoacetate, iodoacetate, fluoroacetate, acid tartrate, acid maleate, para-bromobenzenesulfonate, benzenesulfonate, or the like, of 14α-methylhydrocortisone.

*Example 14.—14α-methylcortisone 21-acetate (14α-methyl - 17α,21 - dihydroxy-4-pregnene - 3,11,20-trione 21-acetate)*

A solution was prepared containing 0.2 gram of 14α-methylhydrocortisone acetate (14α-methyl-11β,17α,21-trihydroxy-4-pregnene-3,20-dione 21-acetate), 100 milligrams of sodium dichromate, 0.5 milliliter of water and five milliliters of acetic acid. This mixture was allowed to stand at room temperature (about 23 to 25 degrees centigrade) for a period of four hours. Thereupon one milliliter of ethyl alcohol was added and the mixture diluted with fifty milliliters of water and extracted with three fifteen-milliliter portions of methylene chloride. The methylene chloride extracts were dried over anhydrous sodium sulfate, evaporated and the thus-obtained residue repeatedly recrystallized from methanol to give 14α-methylcortisone acetate (14α-methyl-17α,21-dihydroxy-4-pregnene-3,11,20-trione 21-acetate).

In the same manner, oxidizing other 14α-methylhydrocortisone 21-acylate such as the 21-propionate, butyrate, valerate, hexanoate, heptanoate, octanoate, benzoate, phenylacetate, or the like with chromic anhydride, sodium or potassium dichromate in solution usually in acetic acid produces the corresponding 14α-methylcortisone 21-acylate such as the 14α-methyl-17α,21-dihydroxy-4-pregnene-3,11,20-trione 21-propionate, trimethylacetate, butyrate, isobutyrate, valerate, hexanoate, heptanoate, octanoate, benzoate, phenylacetate, phenylpropionate, toluate, and the like.

*Example 15.—14α-methylcortisone (14α-methyl-17α,21-dihydroxy-4-pregnene-3,11,20-trione)*

A solution was prepared containing 0.1 gram of 14α-methyl-17α,21-dihydroxy-4-pregnene-3,11,20-trione 21-acetate in ten milliliters of methanol. Through this solution was passed a stream of nitrogen for a period of ten minutes to purge the solution of oxygen from the air. Thereupon a similarly treated solution of 0.5 gram of potassium hydroxide in ten milliliters of methanol and one milliliter of water purged of air by passage of oxygen-free nitrogen was added to the first solution and the mixture allowed to stand at room temperature (about 25 degrees centigrade) for a period of three hours. The reaction mixture was thereupon poured into 100 milliliters of water, neutralized with dilute acetic acid and extracted with three 25-milliliter portions of methylene chloride. The combined methylene chloride extracts were dried over anhydrous sodium sulfate, evaporated and the thus-obtained residue recrystallized three times from acetone Skellysolve B hexane to give 14α-methyl-17α,21-dihydroxy-4-pregnene-3,11,20-trione (14α-methylcortisone).

In the same manner other 21-esters of 14α-methylcortisone can be hydrolyzed with a base to give the free diol, 14α-methyl-17α,21-dihydroxy-4-pregnene-3,11,20-trione.

*Exampe 16.—14α-methylcortisone propionate (14α-methyl-17α,21-dihydroxy-4-pregnene-3,11,20-trione 21-propionate)*

A solution of 100 milligrams of 14α-methyl-17α,21-dihydroxy-4-pregnene-3,11,20-trione in two milliliters of pyridine and two milliliters of propionic anhydride was allowed to stand for a period of eighteen hours overnight at room temperature (about 25 degrees centigrade). The mixture was thereupon poured into 75 milliliters of water, the precipitate collected on filter paper and recrystallized from methanol to give 14α-methylcortisone 21-propionate (14α-methyl-17α,21-dihydroxy-4-pregnene-3,11,20 - trione 21-propionate).

*Example 17*

In the same manner as shown in Example 16, treating a pyridine solution of 14α-methyl-17α,21-dihydroxy-4-pregnene-3,11,20-trione with (a) acetic anhydride yielded 14α-methylcortisone acetate, (b) butyric anhydride yielded 14α-methylcortisone butyrate, (c) valeric anhydride yielded 14α-methylcortisone valerate, (d) isovaleryl chloride yielded 14α-methylcortisone isovalerate, (e) hexanoyl chloride yielded 14α-methylcortisone hexanoate, (f) heptanoyl bromide yielded 14α-methylcortisone heptanoate, (g) octanoyl chloride yielded 14α-methylcortisone octanoate, (h) benzoyl chloride yielded 14α-methylcortisone benzoate, (i) phenylacetyl chloride yielded 14α-methylcortisone phenylacetate, (j) phenylpropionyl chloride yielded 14α-methylcortisone phenylpropionate, (k) 2-furoyl chloride yielded 14α-methylcortisone (2-furoate), (l) nicotinyl chloride yielded 14α-methylcortisone nicotinate, (m) toluenesulfonyl chloride yielded 14α-methylcortisone toluenesulfonate, (n) trimethylacetyl chloride yielded 14α-methylcortisone trimethylacetate, (o) dineopentylacetyl chloride yielded 14α-methylcortisone dineopentylacetate, and (p) tertiarybutylacetyl chloride yielded 14α-methylcortisone tertiarybutyl acetate.

In the same manner as shown in Example 17, using anhydrides or acid halides of other organic acids to esterify 14α-methylcortisone, produces such esters as the 21- isobutyrate, cinnamate, acid tartrate, acid succinate, acid maleate, β-cyclopentylpropionate, benzenesulfonate, anisate, para-chlorobenzenesulfonate, 3,5-dinitrobenzenesulfonate, fluoroacetate, chloroacetate, bromoacetate, iodoacetate, and the like.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A steroid compound selected from the group consisting of 14α-methyl-17α,21-dihydroxy-4-pregnene-3,11,20-trione, 14α-methyl-17α,21-dihydroxy-4-pregnene-3,11,20-trione 21-acylate, 14α-methyl-11β,17α,21-trihydroxy-4-pregnene-3,20-dione and 14α-methyl-11β,17α,21-trihydroxy-4-pregnene-3,20-dione 21-acylate, wherein the acyl radical is of a hydrocarbon carboxylic acid containing from one to twelve carbon atoms, inclusive.

2. 14α-methyl-17α,21-dihydroxy-4-pregnene - 3,11,20-trione.

3. 14α-methyl-17α,21-dihydroxy-4-pregnene - 3,11,20-trione 21-acetate.

4. 14α-methyl-11β,17α,21-trihydroxy-4-pregnene - 3,20-dione.

5. 14α-methyl-11β,17α,21-trihydroxy-4-pregnene - 3,20-dione 21-acetate.

6. 14α-methyl-11β,17α,21-trihydroxy-4-pregnene - 3,20-dione 21-benzoate.

No references cited.